United States Patent [19]
Tretter et al.

[11] Patent Number: 5,927,218
[45] Date of Patent: Jul. 27, 1999

[54] BUFFER CIRCUIT ON A MODULE

[75] Inventors: Albert Tretter, Schirmitz; Karl Weber, Altdorf; Karl-Theo Kremer, Adelsdorf, all of Germany

[73] Assignee: Siemens AG, Munich, Germany

[21] Appl. No.: 09/011,710

[22] PCT Filed: Jul. 24, 1996

[86] PCT No.: PCT/DE96/01367

§ 371 Date: Jun. 24, 1998

§ 102(e) Date: Jun. 24, 1998

[87] PCT Pub. No.: WO97/07442

PCT Pub. Date: Feb. 27, 1997

[30] Foreign Application Priority Data

Aug. 11, 1995 [DE] Germany .................... 195 29 718

[51] Int. Cl.⁶ ......................................... G06F 9/00
[52] U.S. Cl. ............................. 112/38; 712/29; 712/33; 712/39; 710/1; 710/5
[58] Field of Search .................... 712/29, 33, 38, 712/39; 710/5, 1

[56] References Cited

U.S. PATENT DOCUMENTS

| | | | |
|---|---|---|---|
| 4,415,985 | 11/1983 | McDaniel et al. | 345/516 |
| 4,912,633 | 3/1990 | Schweizer et al. | 710/110 |
| 5,740,466 | 4/1998 | Geldman et al. | 710/5 |

FOREIGN PATENT DOCUMENTS

| | | |
|---|---|---|
| 0 622 712 | 11/1994 | European Pat. Off. . |
| WO 86/04701 | 8/1986 | WIPO . |
| WO 90/09474 | 8/1990 | WIPO . |
| WO 91/14324 | 9/1991 | WIPO . |

*Primary Examiner*—Meng-Ai T. An
*Assistant Examiner*—Dzung C. Nguyen
*Attorney, Agent, or Firm*—Kenyon & Kenyon

[57] ABSTRACT

A buffer circuit of a decentralized peripheral module. The buffer circuit has three input and three output signal storage areas, which can be selectively connected to a bus interface or a module interface via a selection circuit. Thus the process signal transfer from an intelligent unit arranged on the module to a unit of a higher level than the module and vice-versa can be completely separated.

4 Claims, 2 Drawing Sheets

BUFFER CIRCUIT ON A MODULE

FIELD OF THE INVENTION

1. The present invention relates to a buffer circuit arranged on a module for intermediate data storage.

2. Background Information

Decentralized systems are being increasingly used in automation technology. In such systems, input signals of a controlled industrial process are entered by decentralized peripheral modules and transmitted to a higher-level arithmetic unit located at a distance from the modules. The arithmetic unit can be, for example, the central processor of a stored-program controller. The arithmetic unit then processes the input signals and, from the input signals and possibly from additional internal values of the arithmetic unit, generates output signals that are subsequently forwarded via the field bus to the decentralized peripheral modules. These in turn output the output signals to the industrial process being controlled.

The input signals are input from the industrial process and the output signals are output to the industrial process by intelligent units in the peripheral modules, for example, microprocessors. The intelligent units are basically only responsible for sole function of inputting and outputting the signals.

The cycle time needed by the intelligent units for entering the input signals and outputting the output signals is normally very different from the time between two access periods of the higher-level arithmetic unit to the input signals or the output signals. Therefore, the input and output signals cannot be forwarded immediately from the intelligent unit of the peripheral module to the higher-level arithmetic unit and vice-versa, but must be temporarily stored in the decentralized peripheral module.

SUMMARY OF THE INVENTION

An object of the present invention is to provide a circuit arrangement which allows a higher-level arithmetic unit and an intelligent unit of the decentralized peripheral module to input data into and output from an intermediary storage device independently of one another and with no possibility of mutual blocking despite the intermediate storage.

The buffer circuit is normally arranged in an integrated circuit, e.g., a communication ASIC. The communication ASIC is normally also responsible for other communication functions, for which it must have additional storage space. Since ASIC storage space is still an expensive and scarce resource, the storage area available can be maximized by having variable-length buffer circuit storage areas.

DETAILED DESCRIPTION OF THE INVENTION

Figure 1:
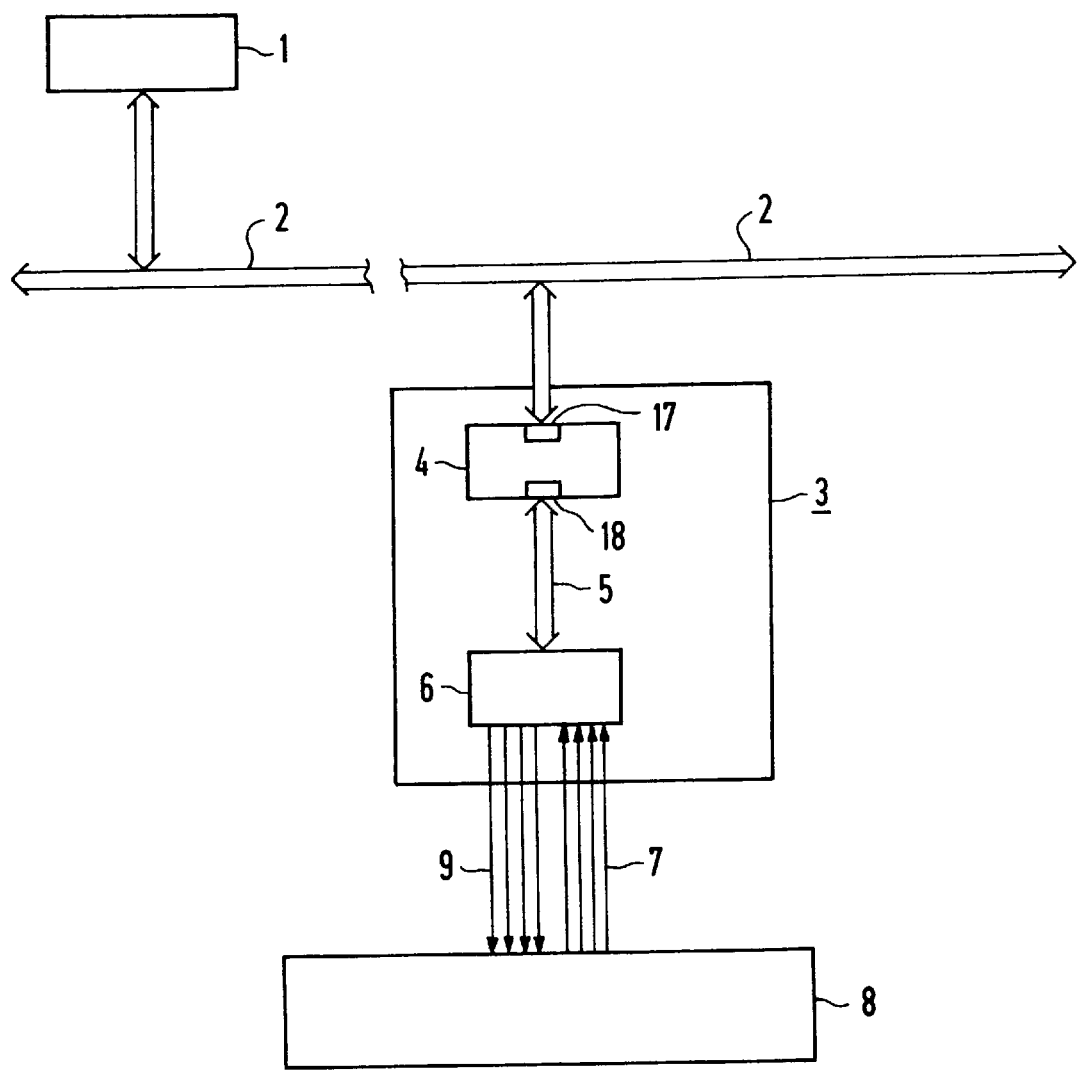
FIG. 1 shows a distributed automation system.

According to FIG. 1, central processor 1 of a stored-program controller is connected to decentralized peripheral module 3 via field bus 2. For purposes of clarity, only one peripheral module 3 is illustrated in FIG. 1.

Peripheral module 3 has an application-specific integrated circuit (ASIC) 4, which is connected to field bus 2 and, through lines 5 internal to the module, to a microprocessor 6. Microprocessor 6 represents an intelligent unit arranged on module 3.

Microprocessor 6 is connected, via input lines 7, to processor elements (not illustrated) of an industrial process 8, e.g., a burner control. Microprocessor 6 is also connected, via output lines 9, to process actuators (also not illustrated) of industrial process 8.

Figure 2:
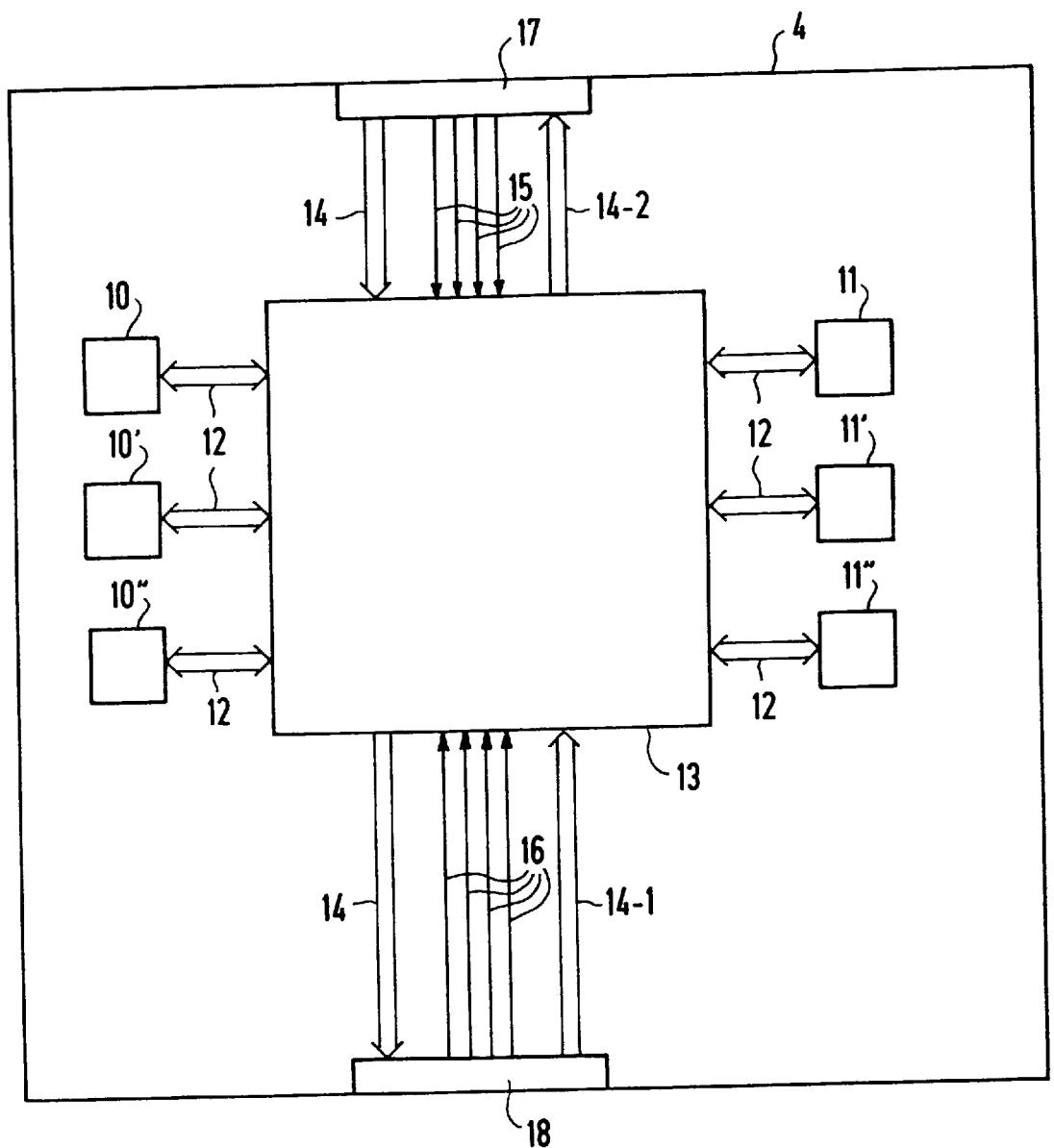
FIG. 2 shows a buffer circuit according to the present invention.

The communication ASIC 4, illustrated in detail in FIG. 2, contains the buffer circuit for intermediary storage of input and output signals in accordance with the present invention. According to FIG. 2, ASIC 4 has three input signal storage areas 10, 10', and 10'', as well as three output signal storage areas 11, 11'', and 11''. Storage areas 10, 10', 10'', 11, 11', and 11'' are connected, via buses 12, to a selection circuit 13, which is in turn connected to a bus interface 17 and a module interface 18 via buses 14 and control lines 15, 16.

Input signals entered by microprocessor 6 from industrial process 8 are supplied, via module interface 18 and bus 14-1, to selection circuit 13, which then stores the input signals in one of input signal storage areas 10, 10', 10''. From there the input signals are subsequently transferred to field bus 2 and central processor 1 via selection circuit 13, bus 14-2, and bus interface 17. Conversely, output signals are stored by central processor 1 in storage areas 11, 11', 11'' via field bus 2, bus interface 17, bus 14-3, and selection circuit 13. These are then retrieved by microprocessor 6 via selection circuit 13, bus 14-4, and module interface 18 and output to industrial process 8.

From the above, it can be seen that each interface 17, 18 can be connected to each storage area 10, 10', 10'', 11, 11', 11''. At any given time, however, bus interface 17 is only connected to one of input storage areas 10, 10', 10'' and one output signal storage area 11, 11', 11''. Module interface 18 is also connected to another input signal storage area 10, 10', 10'', and another output storage area 11, 11', 11''. For example, at a given time, bus interface 17 can be connected with storage areas 10 and 11, while module interface 18 is connected to storage areas 10'' and 11''.

As is known in automation technology, when data is transferred, the entire set of input or output signals is always updated, rather than individual data. This is necessary to keep the input and output signals consistent in relation to one another. Therefore, if there were only one input signal storage area 10, 10', or 10'', it would not be possible to transmit data to central processor 1 while signals were being written by microprocessor 6. Thus, central processor 1 would have to wait until the write process was completed by microprocessor 6. Microprocessor 6 would also have to wait, if data was being read from input signal storage area 10, until the reading was completed. Microprocessor 6 and central processor 1 would thus have to wait for one another when transmitting input signals. The same is true, in a similar manner, for the transmission of output signals from central processor 1 to microprocessor 6.

If there are two input signal storage areas, microprocessor 6 can write input signals into one of the input signal storage areas, e.g., storage area 10', while signals are read from another storage area, e.g., storage area 10, and transmitted to central processor 1. Thus data transmission from microprocessor 6 to storage areas 10, 10' and further to central processor 1 appears to be separated.

This separation is, however, as mentioned above, only an appearance. Assume, for example, that at time $t_0$ input signals are read from storage area 10 and transmitted to central processor 1, while microprocessor 6 writes input signals to storage area 10'. At this time, writing and reading of output signals are separated from one another. However, the writing cycle and the reading cycle are probably not completed simultaneously. For example, at time $t_1$ the write cycle of microprocessor 6 is completed, while the read cycle to central processor 1 continues. If at this time $t_1$ microprocessor 6 reads new input data and wishes to store it in an intermediary storage, it does not have available to it the storage area from which central processor 1 is reading its data, i.e., storage area 10, since otherwise data might become inconsistent. If, however, microprocessor 6 writes into the second storage area, where it wrote immediately before, i.e., storage area 10', the reading by central processor 10 might end during this writing cycle. Then central processor 1 cannot start the next reading cycle, since it either must reread data already read by and known to it, which makes no sense, or it must read from a storage area that will be immediately overwritten, which is not allowable due to the danger of data inconsistency. The data traffic is not yet completely separated even with two storage areas for each direction of transmission.

The problem is solved by providing a third storage area for each direction of transmission, i.e., three input signal storage areas 10, 10', 10", and three output signal storage areas 11, 11', 11". In this case it is guaranteed that a storage area where new data can be written without overwriting previously written data is available at any time.

Storage areas 10, 10', 10", 11, 11', 11" can be selected by selection circuit 13, for example by communicating to selection circuit 13, via control lines 15 and 16, when a new read or write cycle begins and ends. Selection circuit 13 can then guarantee, e.g., by adding an appropriate offset address to the storage area to be read at that time, that reading will take place from the desired storage area 10, 10', 10", 11, 11', or 11".

As mentioned above, the buffer circuit is normally arranged in a communication ASIC 4. Communication ASIC 4 is normally also responsible for other communication functions requiring storage space, in addition to the process image transfer, i.e., the transfer of input and output signals. Therefore, in order to optimize the communication ASIC, it is advantageous if storage areas 10, 10', 10", 11, 11', 11" have variable lengths, since in this case the storage length can be adjusted to the actual need, so that needed storage area cannot be assigned to other communication functions. For example, it is possible to tell selection circuit 13 how many bytes are needed by each input signal storage area 10, 10', 10" and each output storage area 11, 11', 11".

What is claimed is:

1. A buffer circuit arrangement arranged on a module, the arrangement comprising:
   at least three input signal storage areas for an intermediate storage of input signals;
   at least three output signal storage areas for an intermediate storage of output signals;
   a bus interface for communicating with a unit via a bus, wherein the unit is of a higher level than the module, and wherein the unit is arranged at a distance from the module;
   a module interface for communicating with an intelligent unit arranged on the module, the intelligent unit being connectable to at least one of a process sensor element of an industrial process and a process actuator for the industrial process; and
   a selection circuit coupled to the bus interface, the module interface, the at least three input signal storage areas, and the at least three output signal storage areas, the selection circuit selectively coupling the bus interface to each of the at least three input signal storage areas and to each of the at least three signal output storage areas, the selection circuit further selectively coupling the module interface to each of the at least three input signal storage areas and to each of the at least three output signal storage areas,
   wherein, at a predetermined time, the bus interface is coupled by the selection circuit to one of the at least three input signal storage areas and to one of the at least three output signal storage areas, and the module interface is coupled by the selection circuit to another of the at least three input signal storage areas and to another of the at least three output signal storage areas.

2. The buffer circuit arrangement according to claim 1, wherein each of the at least three input signal storage areas and each of the at least three output signal storage areas have a variable length.

3. The buffer circuit arrangement according to claim 2, wherein a minimum difference between the length of each of the at least three input signal storage areas and the length of each of the at least three output signal storage areas is one byte.

4. The buffer circuit arrangement according to claim 1, wherein the buffer circuit arrangement is integrated into an integrated circuit.

* * * * *